(12) United States Patent
Tokushima (10) Patent No.: US 8,355,611 B2
(45) Date of Patent: Jan. 15, 2013

(54) PHOTONIC CRYSTAL ELEMENT (75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 283 days.

(21) Appl. No.: 12/811,900

(22) PCT Filed: Nov. 25, 2008

(86) PCT No.: PCT/JP2008/071328
§ 371 (c)(1),
(2), (4) Date: Jul. 7, 2010

(87) PCT Pub. No.: WO2009/087825
PCT Pub. Date: Jul. 16, 2009

(65) Prior Publication Data
US 2010/0278487 A1 Nov. 4, 2010

(30) Foreign Application Priority Data

Jan. 11, 2008 (JP) .................................. 2008-003856
Jun. 12, 2008 (JP) .................................. 2008-154136

(51) Int. Cl.
*G02B 6/26* (2006.01)
(52) U.S. Cl. ................. 385/43; 385/27; 385/44; 385/50; 385/130; 385/132
(58) Field of Classification Search ............... 385/16, 385/27, 31, 39, 43, 44, 48, 50, 129–132
See application file for complete search history.

(56) References Cited

U.S. PATENT DOCUMENTS 6,560,006 B2 * 5/2003 Sigalas et al. ............... 359/321
2002/0159733 A1 * 10/2002 Flory et al. ................... 385/125
2005/0152656 A1 * 7/2005 Talneau et al. ............... 385/129

FOREIGN PATENT DOCUMENTS

| JP | 2002365599 A | 12/2002 |
| JP | 2003202439 A | 7/2003 |
| JP | 2005509918 A | 4/2005 |
| JP | 2005274844 A | 10/2005 |

OTHER PUBLICATIONS

International Search Report for PCT/JP2008/071328 mailed Jan. 13, 2009.
K. Takayama et al., "Propagation characteristics of photonic crystal waveguide with stubs and their applications to optical filters", IEICE Technical Report, vol. 107, No. 124, Jun. 22, 2007, pp. 59-64.
R. Stoffer et al., "Numerical studies of 2D photonic crystals: Waveguides, coupling between waveguides and filters", Optical and Quantum Electronics, Aug. 2000, vol. 32. pp. 947-961.
Ahmad Rifqi Md Zain et al., "Tapered Photonic Crystal Microcavities Embedded in Photonic Wire Waveguides With Large Resonance Quality-Factor and High Transmission", IEEE Photonics Technology Letters, vol. 20, No. 1, Jan. 1, 2008, pp. 6-8.
M. Palamaru et al., "Photonic crystal waveguides: Out-of-phone losses and adiabatic model conversion", Applied Physics Letters, vol. 78, No. 11, Mar. 12, 2001, pp. 1466-1468.

* cited by examiner

*Primary Examiner* — Uyen Chau N Le
*Assistant Examiner* — Michael Mooney (57) ABSTRACT

A waveguide stub is connected to a pillar-type square-lattice photonic crystal waveguide. Within the waveguide stub, the diameter of a defect is made larger than that of the original photonic crystal waveguide thereby reducing the group velocity of a guided light. The original waveguide and the waveguide stub are smoothly connected via a taper waveguide. Because of low group velocity of light in the waveguide stub, free spectral range (FSR) decreases thereby allowing the size of the waveguide stub to be reduced.

9 Claims, 8 Drawing Sheets

PHOTONIC CRYSTAL ELEMENT

The present application is the National Phase of PCT/JP2008/071328, filed Nov. 25, 2008, which claims the priority based on JP2008-3856 filed on Jan. 11, 2008 and JP2008-154136 filed on Jun. 12, 2008, and all of the disclosures are herein incorporated.

TECHNICAL FIELD

The present invention relates to a photonic crystal element, and particularly to a photonic crystal element having a waveguide structure.

BACKGROUND ART

It is desired that a technology appears for realizing an optical integrated circuit in which optical components are integrated like a transistor integrated circuit, in which electronic components are integrated. At present, an optical circuit is assembled by connecting optical components such as optical switches, wavelength filters, 3-dB couplers (optical couplers), etc. via optical waveguides such as optical fibers.

However, if a plurality of optical components can be integrated into a small chip, it is possible to dramatically reduce the volume, power consumption, and manufacturing cost of an optical circuit.

A host of technologies with the aim of realizing an optical integrated circuit have been developed so far, and among them is photonic crystal technology. A photonic crystal element or a photonic crystal, is, in a broad sense, a generic name for a structure in which the refractive index is periodically varied. In the present description, unless otherwise stated, "photonic crystal element" and "photonic crystal" are used as synonyms.

A photonic crystal has various special optical characteristics that originate from a periodic structure of refractive index distribution. The most representative characteristic is a photonic band gap (PBG). While, generally, light can pass through a photonic crystal, if periodic variation of refractive index within a photonic crystal is sufficiently large, light in a specific frequency band cannot propagate within the photonic crystal. A frequency band (or a wavelength band) of light in which light can pass through a photonic crystal is referred to as a photonic band. In contrast with that, a frequency band, light in which cannot be transmitted is called a photonic band gap (PBG) since it is a gap that is present between photonic bands. A plurality of PBGs may be present in different frequency bands. Photonic bands partitioned by PBGs are sometimes called a first band, a second band, a third band, etc. from the lower frequency side.

If a minute defect which disturbs the periodic structure of a refractive index (the periodicity of refractive index distribution) is present, light whose frequency is within a PBG will be confined in the minute defect. In that case, since only light whose frequency corresponds to the size of the defect is confined, a photonic crystal functions as an optical resonator. Therefore, such a photonic crystal can be employed as a frequency (wavelength) filter.

Moreover, when minute defects are successively positioned side by side in a line to form a line defect in a crystal, light whose frequency is within a PBG will be confined in the line defect and will propagate along the line defect. Therefore, such a photonic crystal can be employed as an optical waveguide. Such an optical waveguide formed within a photonic crystal is called a line-defect waveguide.

Once an optical filter and an optical waveguide are formed, it is possible to make up an optical functional element such as an optical modulator and an optical switch, etc. from one of them or a combination thereof. It is possible to make up an optical circuit by forming major optical functional elements within a photonic crystal and connecting those optical functional elements. From this reason, there are expectations for photonic crystals to be a platform for optical integrated circuits.

Here, in order to utilize the effect of a PBG in three mutually orthogonal directions x, y, z, the refractive index distribution of the photonic crystal is required to have a three-dimensional periodic structure. However, since a three dimensional periodic structure is complex, the manufacturing cost thereof tends to increase. Accordingly, it is often the case that a photonic crystal whose refractive index distribution has a two-dimensional periodic structure (hereafter, may be referred to as a "two-dimensional photonic crystal") is utilized. Specifically, a two-dimensional photonic crystal with a finite thickness, whose refractive index distribution has a periodicity in the substrate plane, but no periodicity in the thickness direction, is utilized. In such a case, the confinement of light in the thickness direction of the substrate is realized not by the effect of PBG, but by the total internal reflection caused by the refractive index difference.

Of course, it is noted that characteristics of a two-dimensional photonic crystal with a finite thickness will not be in perfect agreement with those of a two-dimensional photonic crystal with infinite thickness. However, if the refractive index distribution in the thickness direction of a two-dimensional photonic crystal with a finite thickness holds a mirror-reflection symmetry in a region in which light propagates, its optical characteristics substantially agree with those of a two-dimensional photonic crystal with infinite thickness. The performance prediction of a device made of a two-dimensional photonic crystal with infinite thickness is far easier than a performance prediction taking finite thickness into consideration. Accordingly, if it is possible to utilize a two-dimensional photonic crystal whose refractive index distribution holds a mirror-reflection symmetry, the design of a device which utilizes it will become easier.

So far, several specific structures of two-dimensional photonic crystals with finite thicknesses have been realized. Among them, a pillar-type square-lattice photonic crystal has a characteristic that the propagation speed of light in a line-defect waveguide is small in a wide band. That is, the group velocity is small. In general, using a waveguide in which the propagation speed of light is small makes it possible to create an optical circuit of the same function, with a short waveguide length. Therefore, a line-defect waveguide utilizing a pillar-type square-lattice photonic crystal is suitable for optical integrated circuits.

Figure 1:
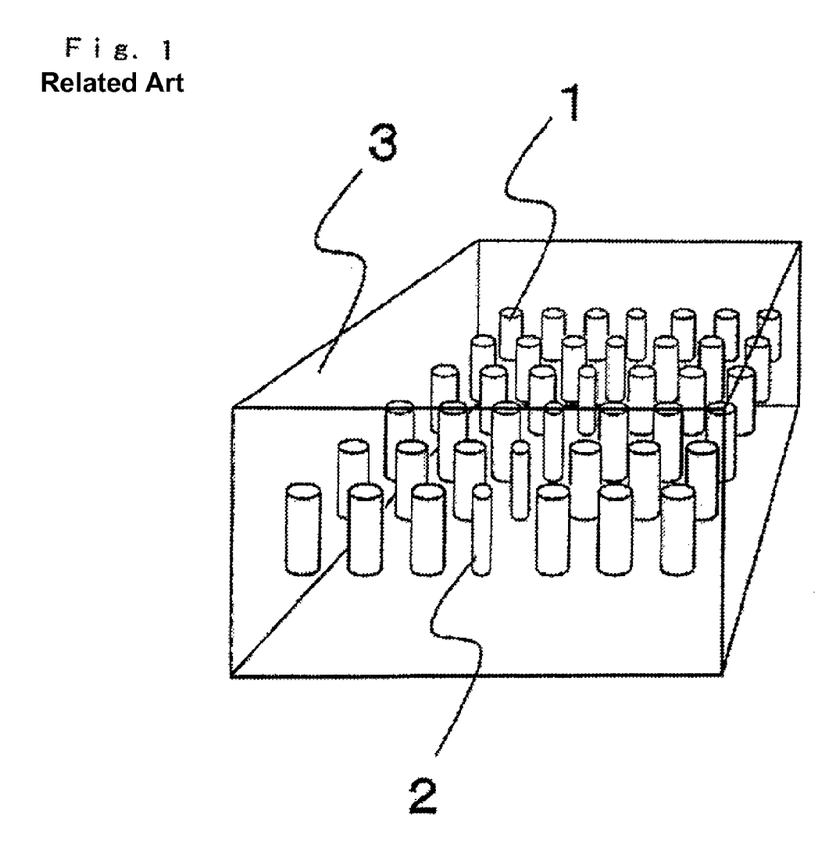
FIG. 1 is an oblique view diagram of a square-lattice pillar-type photonic crystal including a line defect.

FIG. 1 is a schematic diagram showing the structure of a line-defect waveguide of a pillar-type square-lattice photonic crystal with a finite thickness.

As shown in FIG. 1, in the pillar-type square-lattice photonic crystal, circular pillar 1 made of a high dielectric constant material and having a finite height and circular pillar 2 having a smaller diameter than that of circular pillar 1 are disposed in small-dielectric-constant material 3 in a square-lattice pattern. Since the appearance in which these circular pillars are disposed in a square-lattice pattern resembles an appearance in which atoms are disposed in a lattice pattern in a crystal such as silicon and quartz, etc., and since this structure is for use in optics, it is called a "photonic crystal".

Therefore, the materials for small-dielectric-constant material 3 and circular pillars 1 and 2 do not need to be crystalline, and can be amorphous.

In the case of the photonic crystal shown in FIG. 1, while circular pillar 1 is a circular pillar of a perfect photonic crystal, circular pillar 2 has a diameter smaller than that of circular pillar 1. Accordingly, circular pillar 2 is regarded as a defect introduced into a perfect crystal. In the following description, in order to discriminate a circular pillar of a perfect crystal from a circular pillar corresponding to a defect, in some cases, the former is called a "non-line-defect pillar", and the latter a "defect pillar", a "defect circular pillar", or a "line-defect pillar". However, it should be noted that that is not because the line-defect pillar itself has a defect.

Line defect pillars 2 of the photonic crystal shown in FIG. 1 are placed in a row on a certain straight line thereby forming a line, and a line-defect waveguide is formed with a line of line defect pillars 2, and non-line-defect pillars 1 in the periphery thereof. In the line-defect waveguide of the circular-pillar-type square-lattice photonic crystal shown in FIG. 1, the line of line defect pillars corresponds to the core of a total-internal-reflection confinement type waveguide, such as optical fiber; and the lattice of non-line-defect pillars on both sides thereof, and the dielectric material in the periphery correspond to the cladding. As, in the case of a total-internal-reflection confinement type waveguide, it functions as a waveguide only when a core and a cladding are present, in the case of a line-defect waveguide, it operates as a waveguide only when a line defect as well as non-line-defect pillars and a dielectric material in the periphery thereof are present.

Meanwhile, it is possible to give a waveguide of a photonic crystal a function such as filtering, etc. through a relatively simple structure. One type of such a waveguide structure is "Slab-type photonic crystal waveguide provided with resonator stub tuner" disclosed in JP2002-365599A. A short waveguide which is a "connection channel" is connected to a straight waveguide, and a "resonance stub" is connected to a point further from that position. The resonance stub resonates only at a specific wavelength within a transmission band of the straight waveguide. In the case of a light of a wavelength other than a resonance wavelength, the propagating light coming along the straight waveguide barely enters into the "resonator stub" and travels straight ahead as it is. In the case of a light of a resonance wavelength, since the light enters into the "resonator stub" and resonates, the propagating light coming along the straight waveguide will be reflected at the position where the "connection channel" is connected and returns to the original direction.

Thus, the waveguide in which a "resonance stub" is connected at the side of a straight waveguide can be used as a wavelength selection filter of a narrow band.

However, using the above described "resonator stub" results in a problem that, since it resonates only with a specific wavelength in the transmission band of the waveguide thereby operating as a filter, the resonator stub cannot be used when it is desirable to operate it as a filter for lights having a plurality of wavelengths in a wide band.

DISCLOSURE OF THE INVENTION

The present invention has been made in view of the above described problem, and an example of its object is to provide a structure of a waveguide which has of a narrow-band filter characteristic for lights having a plurality of wavelengths in a transmission band.

To solve the above described problem, the present invention includes a photonic crystal, a waveguide within the photonic crystal, the waveguide being able to guide a light having a frequency within a band gap of the photonic crystal, and a waveguide stub connected to control the light within the waveguide.

As described so far, according to the present invention, a waveguide which has characteristics of a narrow-band filter for lights having a plurality of wavelengths within a transmission band is realized.

BEST MODE FOR CARRYING OUT THE INVENTION

Next, exemplary embodiments will be described based on the drawings.

Figure 2:
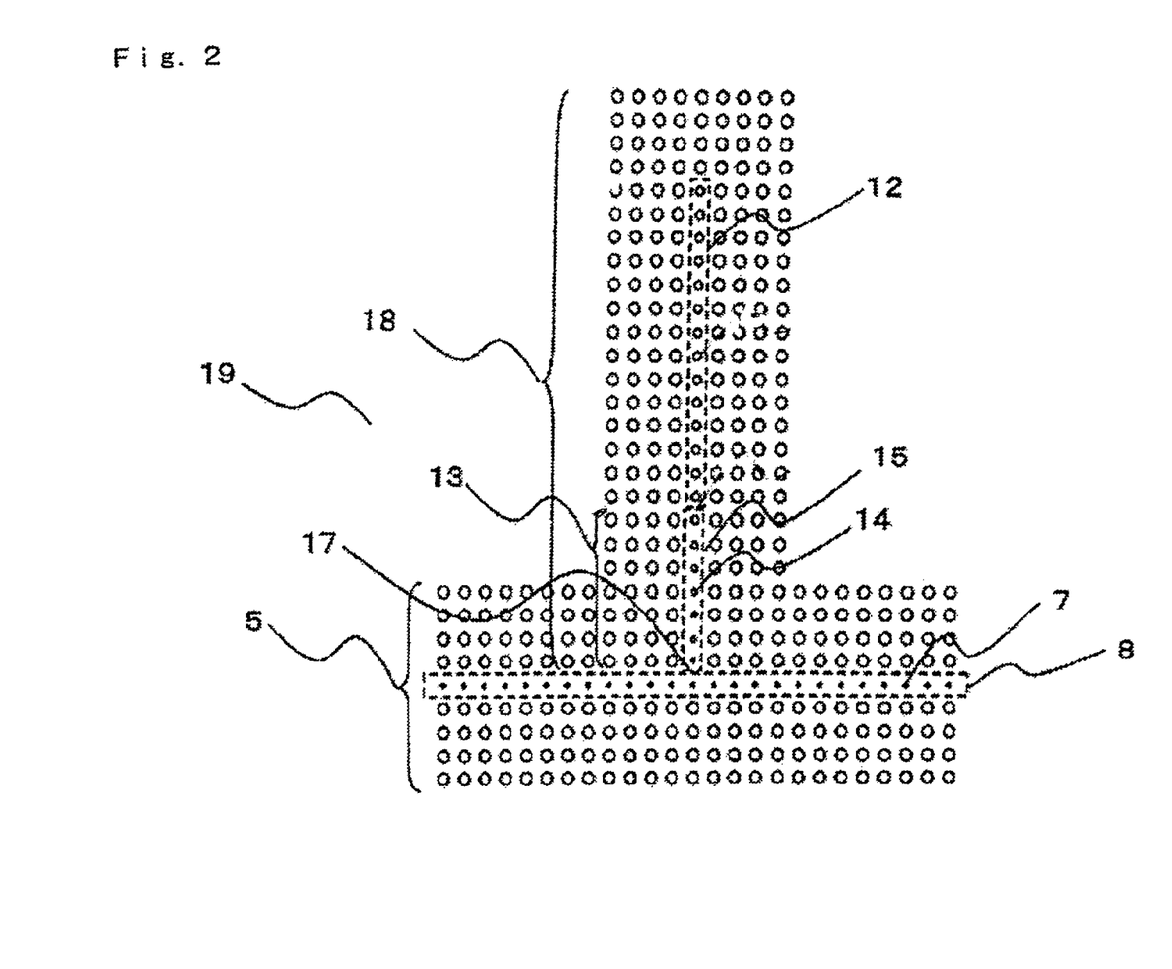
FIG. 2 is a schematic cross-sectional diagram of the photonic crystal element according to a first exemplary embodiment.

FIG. 2 is a schematic view to illustrate a first exemplary embodiment.

As shown in FIG. 2, photonic crystal element 19 of the present exemplary embodiment is in many cases included in an arbitrary pillar-type square-lattice photonic crystal as a part thereof. The periodic lattice of the photonic crystal is a lattice of dielectric pillars having a high refractive index and disposed in a medium of a refractive index smaller than the other part.

Waveguide 5 in the photonic crystal is included, waveguide 5 being able to guide light having a frequency within a band gap of the photonic crystal. That is, in the photonic crystal, the waveguide which includes a periodic lattice includes first defect 8 which is a dielectric pillar of a small cross-sectional area in the periodic lattice.

Waveguide 5 has a structure in which a line of pillars of a small cross-sectional area are introduced in a non-defective photonic crystal. The part of a line defect corresponds to a core, and the photonic crystal in the periphery thereof corresponds to a cladding.

Photonic crystal element 19 includes waveguide stub 18 which is connected to control a light within the waveguide.

Waveguide stub 18 includes at least one of second defects 12 and 15 which are dielectric pillars of small cross-sectional areas. Waveguide stub 18 includes tapered structure 13 and extends perpendicularly from a side wall of waveguide 5. It is characteristic that the cross-sectional area of the dielectric pillars making up the second defect gradually increases as the pillars locate increasingly farther from the waveguide in, at least, a part of the waveguide that includes tapered structure 13. In the case of photonic crystal element 19 shown in FIG.

2, the cross-sectional areas of the dielectric pillars increases as the pillars locate increasingly farther from waveguide 5, in defect 15 in a part of tapered structure 13.

Next, the operation of the first exemplary embodiment will be described.

When light having a guidable frequency is incident from the left of waveguide 5, the light reaches connection point 17 between waveguide 5 and the waveguide stub, and then a part of it travels to waveguide stub 18 and another part of it passes toward the right-hand side of waveguide 5 as it is.

However, the light incident to waveguide stub 18 is reflected at the other end and comes back to connection point 17. While the light that has come back will be split into left and right, at that time, interference takes place between the light which is split to the right hand side and the light and which has first passed directly through waveguide 5. When the light which has directly passed and the light which has come back from the waveguide stub are in phase with each other, all the light will pass to the right hand side of waveguide 5, and when there is a phase difference of it $\pi$(pi), all the lights will be reflected at connection point 17 and return to the left hand side of waveguide 5.

The phase difference between the light which passes directly though waveguide 5 and the light which comes back from waveguide stub 5 is determined by the time taken for the light to travels back and forth in waveguide stub 18.

Introducing tapered structure 13 in waveguide stub 18 results in the cross-sectional areas of dielectric pillars 14 gradually increasing as the pillars locate increasingly farther from waveguide 5 in second defects 15 and 12. In the diagram of the photonic crystal element of FIG. 1, the cross-sectional areas of defects 12 are constant. However, a line-defect waveguide of a pillar-type square-lattice photonic crystal has a characteristic that the larger the cross-sectional area of the pillar of defect, the larger is the variation rate of the wavelength in the waveguide with respect to the change of frequency. Because of this, even if waveguide stub 18 is short, a large variation in wavelength is caused in the waveguide by a slight change in frequency, so that the change in the phase difference of light at connection point 17 increases. As a result, a narrow-band-filter characteristic manifests itself. It is noted that the larger the cross-sectional areas of the pillars of the defect, the smaller is the group velocity of guided light.

It is noted that waveguide 5 may also be configured such that the cross-sectional areas of dielectric pillars 7 of first defect 8 are as large as those of the dielectric pillars of the defect of waveguide stub 18; however, in that case, a disadvantage arises in that the propagation speed of light in waveguide 5 decreases. Therefore, such a configuration is not suitable for components of an optical circuit which processes high-speed optical signals.

In order to avoid that disadvantage, in the first exemplary embodiment, waveguide 5 including a defect of a small cross-sectional area and a waveguide stub including a defect of a large cross-sectional area are connected via tapered structure 13. The tapered structure inhibits undesired reflection which may occur in a portion where the waveguide structure abruptly changes.

Figure 3:
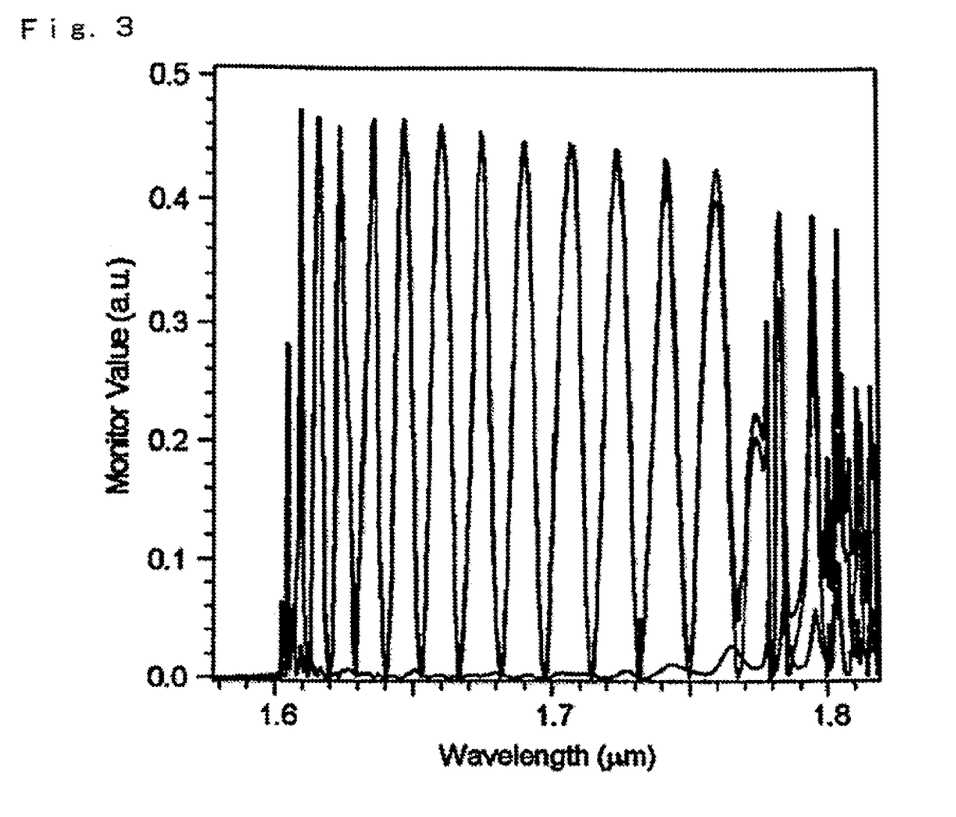
FIG. 3 shows a transmission spectrum of a first structure of the photonic crystal element shown in FIG. 2.
Figure 4:
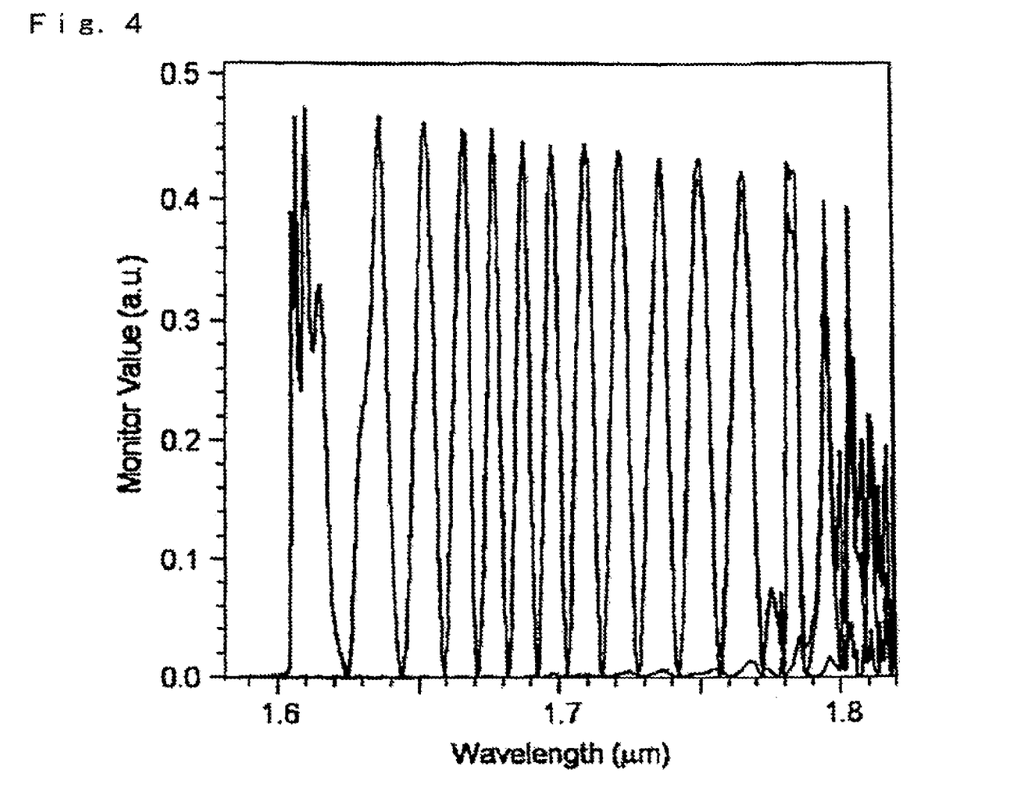
FIG. 4 shows a transmission spectrum of a second structure of the photonic crystal element shown in FIG. 2.

FIG. 3 is a calculation result of the transmission spectrum of a photonic crystal element in which the waveguide stub does not include a tapered structure. FIG. 4 is a transmission spectrum of a photonic crystal element in which the waveguide stub includes a tapered structure.

Although the lengths of the waveguide stubs of both photonic crystal elements are the same, comparing transmission spectra of FIGS. 3 and 4 reveals that the transmission spectrum of FIG. 4, in the case where a waveguide stub is included has, compared with the other transmission spectrum, a smaller interval between wavelengths having high transmittance (where, the wavelength is that in vacuum) near the intermediate position of the transmission band. That is, its free spectral range (FSR) is smaller. Accordingly, the transmission spectrum of FIG. 4 is more advantageous to narrow the 3-dB transmission band, in which not less than half of the optical power is transmitted.

The tapered waveguide may be configured such that the cross-sectional area of the dielectric pillars making up the second defect stepwise increases as they locate increasingly farther from the waveguide in at least a part of the waveguide including a tapered structure.

Moreover, the tapered waveguide may include a portion in which the cross-sectional area of the dielectric pillars making up the second defect gradually increases as they locate increasingly farther from the waveguide as well as a portion in which the cross-sectional area stepwise increases, in at least a part of the waveguide including the tapered structure.

As described so far, according to the present exemplary embodiment, even a small-size photonic crystal element can improve its frequency characteristics. Therefore, the degree of integration of an optical circuit including the first exemplary embodiment increases, allowing us to realize a high-degree of integration and an improved productivity of optical integrated circuits.

Next, the manufacturing method of the photonic crystal element of the present exemplary embodiment will be briefly described.

The photonic crystal element of the present exemplary embodiment can be fabricated of an SOI wafer (Silicon On Insulator Wafer) as a substrate. Among various SOI wafers, one having a buried oxide film with a thickness of 2.0 mm and a silicon active layer with a thickness of 1.0 mm is used. The silicon active layer is non-doped.

First, electron-beam writing technology is used to draw a pattern shown in FIG. 2. When the wavelength of guided light is designed to be 1.55 μm (micrometers) for use in optical telecommunication, a lattice constant is specified to be 0.4 μm and a diameter of circular pillar to be 0.24 μm. The diameter of the line defect pillars are specified to be 0.16 μm in the waveguide portion, and are adapted to gradually increase up to 0.22 μm as they locate increasingly farther from the connection point with the waveguide in the stub waveguide portion. The length of the waveguide stub is specified to be 15 mm.

Next, a silicon active layer is vertically etched by anisotropic dry etching according to the written resist pattern.

Thereafter, the residual resist pattern is removed in acetone, and finally an ultraviolet-curing resin having a refractive index of 1.45, which is the same as that of the buried oxide film (of the SOI wafer), is applied and cured by ultraviolet light to be completed.

The transmittance spectra of FIGS. 3 and 4 show calculation results on the assumption that for the sake of simplicity, the pillars of silicon is infinite in the thickness direction in the above described structure.

Figure 5:
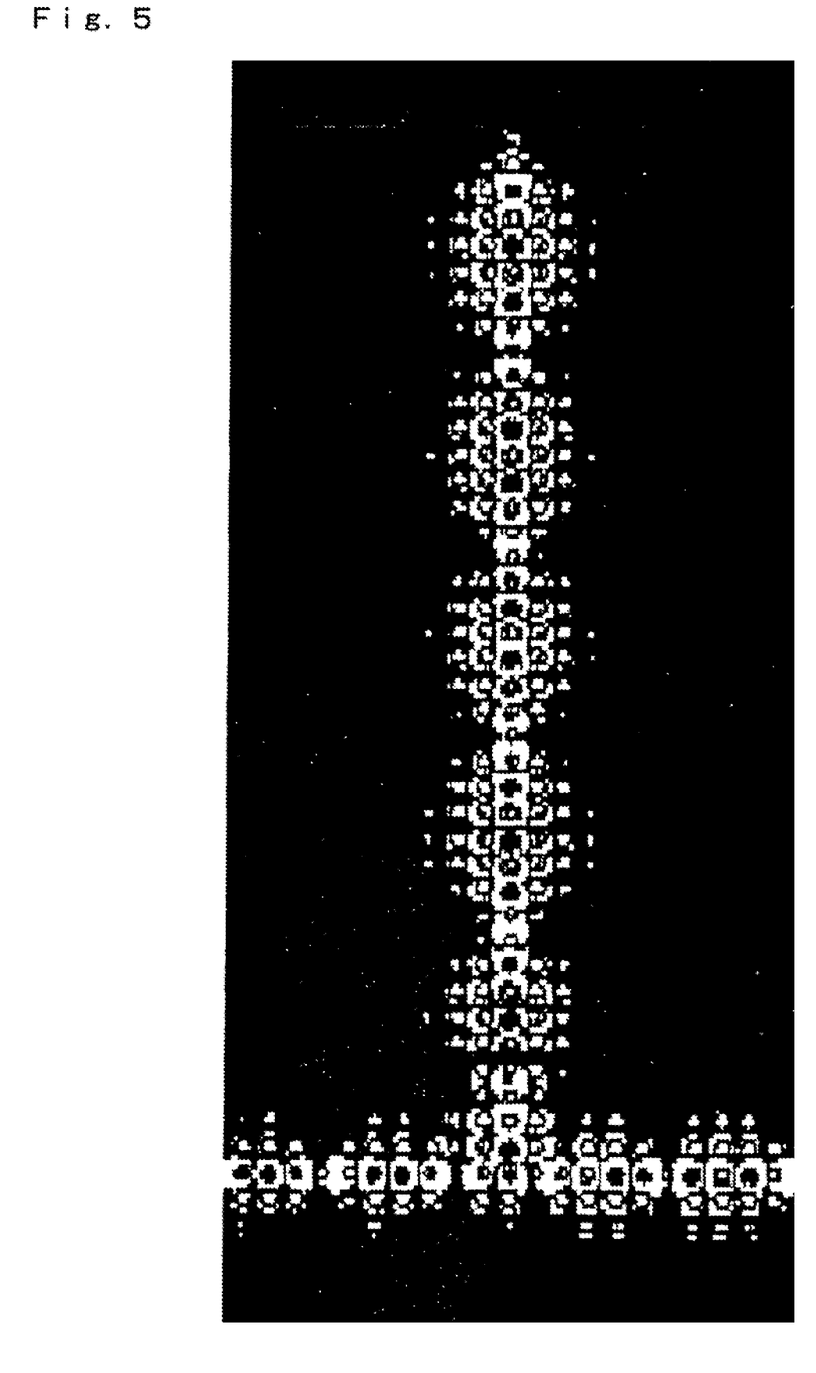
FIG. 5 shows an electromagnetic field distribution of light that propagates in the photonic crystal element shown in FIG. 2.
Figure 6:
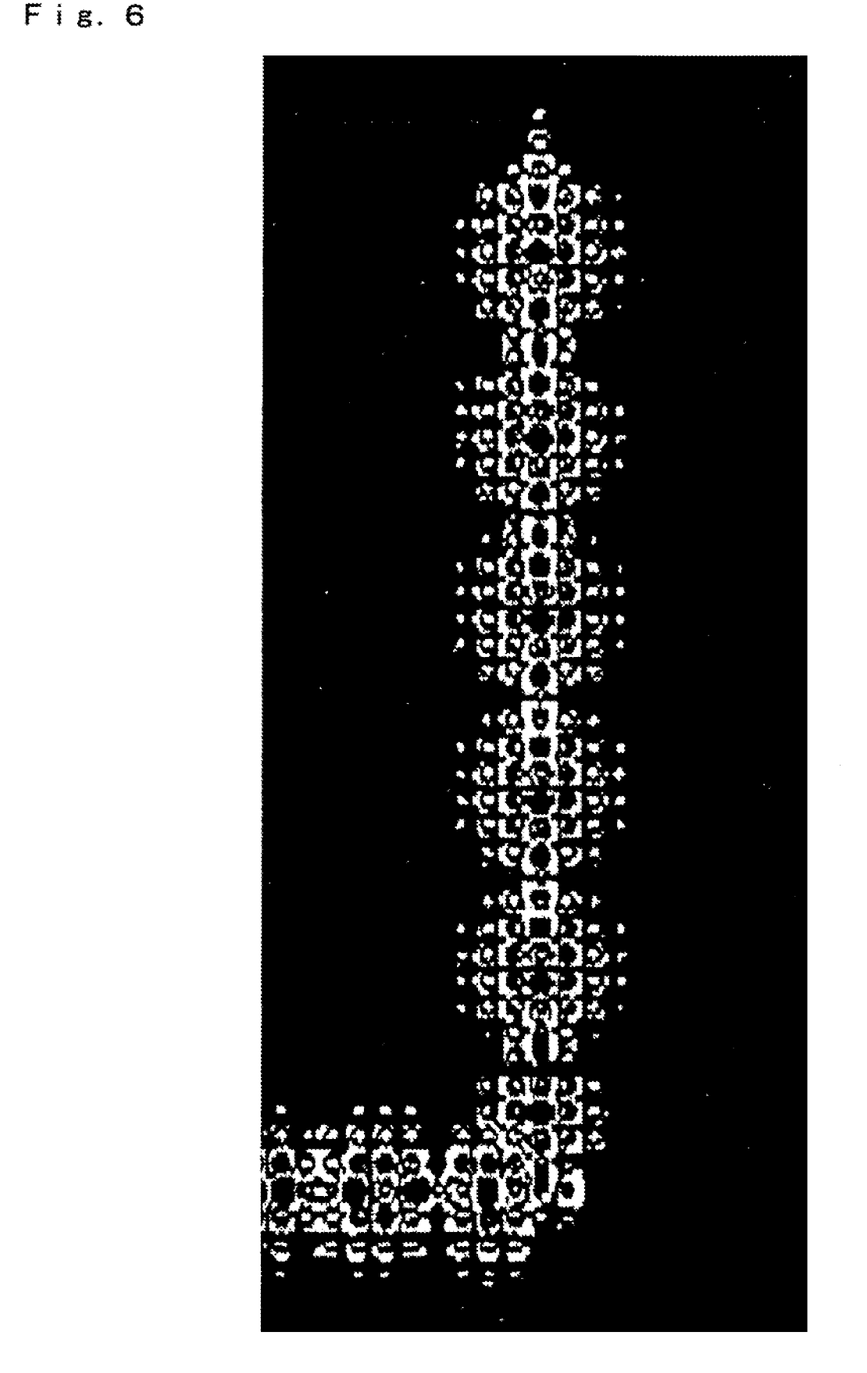
FIG. 6 shows an electromagnetic field distribution of light that is reflected by the photonic crystal element shown in FIG. 2.

Moreover, FIG. 5 shows a calculation result of electric field distribution when light is transmitted and FIG. 6 is a calculation result of electric field distribution when light is not transmitted.

It is noted that while an example of an exemplary embodiment of the photonic crystal element of the present invention has been described, the present invention will not be limited to the above described exemplary embodiment. For example, circular pillars making up the photonic crystal element other than the line defect pillars may be displaced and the cross-sectional areas thereof may be increased or decreased. Further, the pillars are not necessarily circular pillars, and may be of other shapes such as rectangular pillars, octagonal pillars, and the like.

Moreover, since connecting a plurality such as two or three of photonic crystal elements of the present invention that have a different FSR allows the transmission of only the light whose frequency is within an overlap of transmission bands, it is possible, for example, to make only one wave to be transmitted in the transmission band of the waveguide.

Moreover, connecting a plurality of photonic crystal elements of the present invention having the same FSR allows the formation of a flat-top profile of a transmission spectrum in the transmission band and a flat spectral profile of a stop wavelength band.

Next, a second exemplary embodiment will be described.

Since the photonic crystal element of the present invention has a characteristic of a filter having a small FSR, it is possible to operate the photonic crystal element as a 1×1 (one-by-one) optical switch which operates at a plurality of wavelengths or as an optical intensity modulator. That is, the second exemplary embodiment is characterized by including a tuner that adjusts the refractive index or absorption coefficient of the material making up the waveguide stub. It is noted that the tuner may be a temperature regulator, an electric field intensity regulator, or a current regulator.

Figure 7:
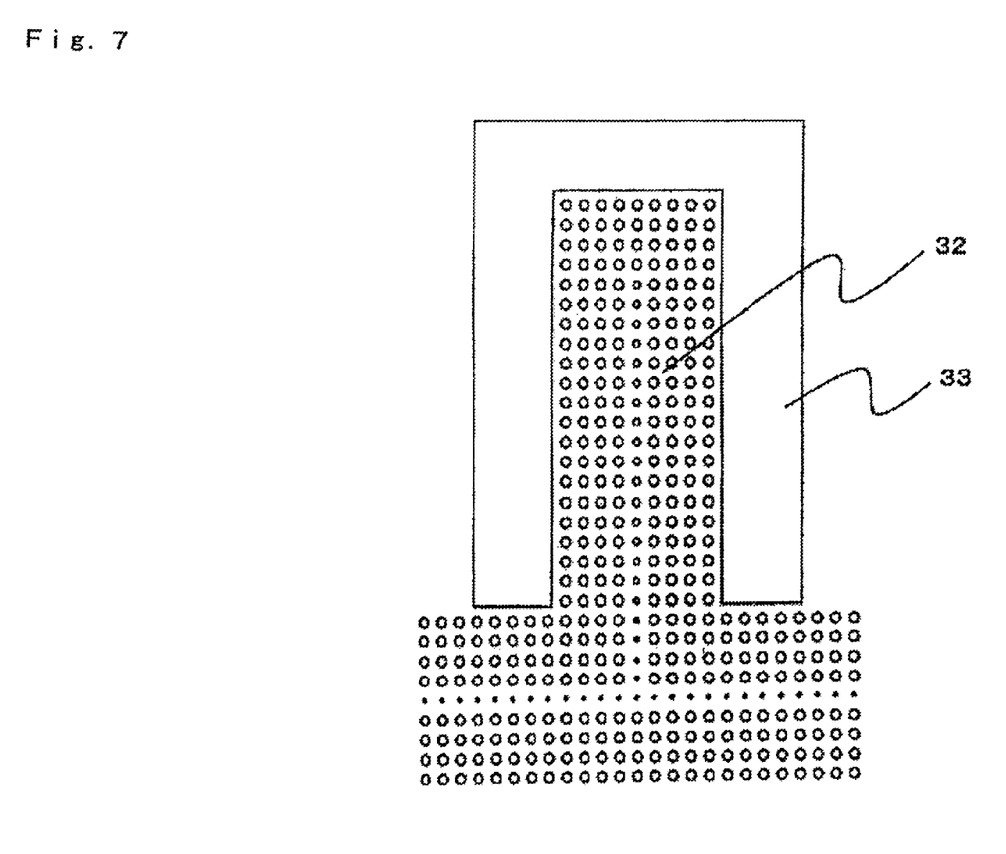
FIG. 7 is a schematic cross-sectional diagram of a photonic crystal element including a tuner.

FIG. 7 shows a photonic crystal element which is provided with heater 33 as a temperature regulator.

Upon heating by heater 33, the refractive index of waveguide stub 32 changes, and the transmission spectrum of the photonic crystal element is shifted to a longer wavelength side or to a shorter wavelength side. As a result, the transmittance of light at a specific wavelength changes, so that the photonic crystal element operates as 1×1 (one-by-one) optical switches or as optical intensity modulators. It is noted that the photonic crystal element operates in the same fashion when the tuner is an electric field intensity regulator or a current regulator.

Since the photonic crystal element of the present exemplary embodiment has a small FSR and a small waveguide stub, it will provide power saving and small-sized optical switches and optical intensity modulators.

Next, a third exemplary embodiment will be described.

In the third exemplary embodiment, the waveguide stub includes a resonator, and the tuning of the refractive index of the waveguide stub is performed by light which resonates in the resonator.

Figure 8:
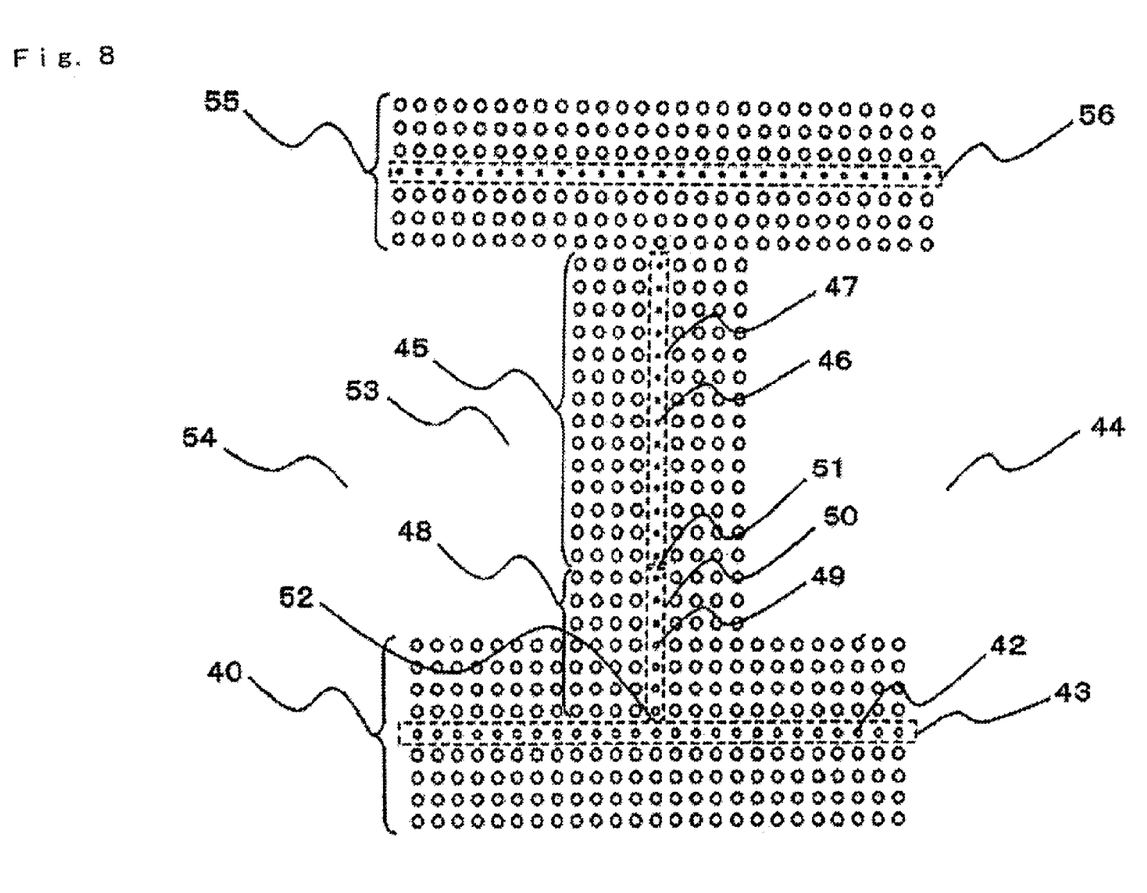
FIG. 8 is a schematic cross-section of a photonic crystal element according to a third exemplary embodiment.

FIG. 8 is a schematic view of a photonic crystal element to illustrate the third exemplary embodiment.

In the photonic crystal element shown in FIG. 8, the cross-sectional area of the dielectric pillars, which make up a defect with a tapered structure of the waveguide, gradually decreases as the pillars locate increasingly farther from the waveguide, in at least a part of the waveguide which forms a waveguide stub and includes a tapered structure.

Specifically, in tapered waveguide 48 which is a part of the waveguide stub, the cross-sectional area of dielectric pillars 49 of line defect 50 decreases as the distance from waveguide 40 increases.

Waveguide 45 has a structure in continuity with tapered waveguide 48. The cross-sectional areas of dielectric pillars 46 of line defect 47 of waveguide 45 are smaller compared with the cross-sectional areas of dielectric pillars 42 of line defect 43 of waveguide 40. Because of this, supposing that the upper limit frequency of the transmission band of waveguide 40 is f1, then waveguide 45 can guide a light that has higher frequency than frequency f1. Suppose the upper limit frequency of the transmission band of waveguide 45 is f2, appropriately adjusting the length of waveguide 45 will cause light having a frequency between f1 and f2, for example, a frequency of f3, to resonate with waveguide 45.

Since the light of frequency f3 cannot pass through waveguide 40, (the light can be confined in waveguide 45, and) waveguide 55 that transmits the light of frequency f3 is placed in the vicinity of waveguide 45 which serves as a resonator.

Waveguide 55 includes line defect 56 made up of a dielectric pillars having a cross-sectional area equal to or substantially equal to that of waveguide 45. Light which comes to propagate through waveguide 55 leaks into waveguide 45 by a very small amount, and the light is reflected at both ends of waveguide 45 to be superimposed in the same phase, so that the energy of light is accumulated in waveguide 45. That is, resonance takes place.

Placing waveguide 45 at an appropriate interval from waveguide 40 and waveguide 55 allows a Q-value, which is a measure of the intensity of light confined by a resonator, to be sufficiently large. That is, the intensity of light accumulated in waveguide 45 can be made a Q multiple of that of the light of frequency f3 which comes to be guided through waveguide 55. Since the Q-value can be not less than several thousands to several tens of thousands, launching light whose frequency f3 and intensity are small will result in accumulation of high intensity light energy in waveguide 45.

As a result of a strong light being present in waveguide 45, a third-order non-liner effect increases in waveguide 45, causing a change of refractive index by a non-negligible amount. Alternatively, if waveguide 45 absorbs even a small amount of light, part of the high intensity light energy accumulated in waveguide 45 will be absorbed and converted into heat thereby heating waveguide 45 so that its refractive index will be subject to change due to a thermo-optic effect.

On the other hand, since light in the transmission band of waveguide 40 passes through waveguide 48 and waveguide 45 as well, waveguide 45 and waveguide 48 operate as a stub, so that waveguide 40 exhibits a periodic transmission characteristic similar to the transmission characteristics of FIGS. 3 and 4.

In the case of the photonic crystal element of FIG. 8, since the guided light of waveguide 45 has a larger group velocity compared to the guided light of waveguide 40, the effect of downsizing the waveguide stub cannot be exploited as in the case of the first exemplary embodiment. However, modulating the refractive index of waveguide 45 by the light of frequency f3 that is incident from waveguide 55 allows the transmission characteristic of waveguide 40 to be shifted to a shorter wavelength side or to a longer wavelength side. That is, the photonic crystal element of FIG. 8 can be operated as a variable optical filter capable of light control. Moreover, the photonic crystal element can also be operated as an optical switch for light control utilizing it.

Although the light guided in waveguide 40 enters even into waveguide 45, since waveguide 48 is configured to be a tapered waveguide, the guide light will not be reflected at connection sections 51 and 52. Because of that, light which has entered into waveguide 45 from waveguide 40 returns to waveguide 40, without being reflected to return at some mid point when it is reflected at the end of waveguide 45; therefore, resonance does not take place in waveguide 45, and the intensity of the leakage light from waveguide 45 to waveguide 55 remains about I/Q of the intensity of the light that passes through waveguide 40.

It is noted that tapered waveguide 48 may be configured such that the cross-sectional area of dielectric pillars 49 making up a defect of line defect 50 stepwise decreases as they locate increasingly farther from waveguide 40. Tapered waveguide 48 may also include a part where the cross-sectional area gradually decreases and a part where the cross-sectional area stepwise increases.

While the photonic crystal element of FIG. 8 has a structure based on a photonic crystal, the third exemplary embodiment is generally not limited to photonic crystal elements, and it can be said that the element is characterized in that it operates as a resonator in which a part or all of the waveguide stub resonates with light whose frequency is outside of the waveguide band of the waveguide.

The third exemplary embodiment is provided with a waveguide in the vicinity of a resonator, the waveguide being able to guide a light having a frequency within a band gap of the photonic crystal and to guide light having a resonance frequency of the resonator, wherein the adjacent resonator and the waveguide are optically coupled.

The configuration may also be such that two or more photonic crystal elements of FIG. 8 are included, in which respective waveguides for control light (a waveguide corresponding to waveguide 55 of FIG. 8) included in individual photonic crystal elements are the same or are connected with each other.

Such configuration allows the refractive indexes of a plurality of waveguide stubs to be varied by a control light having the same wavelength.

Moreover, separately setting a resonance frequency of each stub makes it possible to select the waveguide stub whose refractive index is to be varied by selecting one or a plurality of frequencies of the light that is to be passed through the waveguide for control.

It is noted that in the photonic crystal element of FIG. 8, although the waveguide stub only includes a line of line-defect dielectric pillars whose cross-sectional area decreases as the distance from waveguide 40 increases, this is not limiting. For example, in continuation to waveguide 45, a tapered waveguide which includes a line of line-defect dielectric pillars whose cross-sectional area increase as the distance from waveguide 40 increases, may be added. The present exemplary embodiment is an embodiment in which the first exemplary embodiment and the third exemplary embodiment are combined.

Further, the present invention will not be limited to the above described respective exemplary embodiments. The above described respective exemplary embodiments are for the purpose of demonstration, and any embodiment which has substantially the same configuration as that of the technical concept described in claims of the present invention, and achieves similar operational effects are included within the technical scope of the present invention.

So far the present invention has been described with reference to examples; however, the present invention will not be limited to the above described examples. Various modifications which are understandable by a person skilled in the art can be made to the configuration and details of the present invention within the scope of the present invention.

The invention claimed is:

1. A photonic crystal element, comprising:
a photonic crystal, wherein said photonic crystal has a periodic lattice, said periodic lattice being a square lattice, said periodic lattice being a lattice of dielectric pillars having a high refractive index and being disposed in a medium having a relatively low refractive index;
a first waveguide within the photonic crystal, said first waveguide including a first defect within said periodic lattice, wherein said first defect comprises a dielectric pillar having a small cross-sectional area compared to a cross-sectional area of a non-line defect pillar of the photonic crystal, said first waveguide being able to guide a light whose frequency is within a band gap of the photonic crystal; and
a waveguide stub connected to control the light within the first waveguide, said waveguide stub being a waveguide including a tapered structure, extending perpendicularly from a side wall of the said first waveguide, and including at least one second defect within the periodic lattice, wherein said second defect comprises a dielectric pillar having a small cross-sectional area compared to a cross-sectional area of a non-line-defect pillar of the photonic crystal.

2. The photonic crystal element according to claim 1, wherein
the cross-sectional area of the dielectric pillars making up the second defect gradually increases as the dielectric pillars are located increasingly farther from the first waveguide in at least a part of the waveguide stub including the tapered structure.

3. The photonic crystal element according to claim 1, wherein
the cross-sectional area of the dielectric pillars making up the second defect stepwise increases as the dielectric pillars are located increasingly farther from the first waveguide in at least a part of the waveguide stub including the tapered structure.

4. The photonic crystal element according to claim 1, wherein
the photonic crystal element includes a tuner that adjusts a refractive index of material surrounding said dielectric pillars making up said second defect or an absorption coefficient of material of the waveguide stub.

5. The photonic crystal element according to claim 1, wherein
the cross-sectional area of the dielectric pillars making up the second defect gradually decreases as the dielectric pillars are located increasingly farther from the first waveguide in at least a part of the waveguide stub including the tapered structure.

6. The photonic crystal element according to claim 1, wherein
the cross-sectional area of the dielectric pillars making up the second defect stepwise decreases as the dielectric pillars are located increasingly farther from the first waveguide in at least a part of the waveguide stub including the tapered structure.

7. The photonic crystal element according to claim 1, wherein
a part or all of the waveguide stub operates as a resonator that resonates with a light whose frequency is outside of a waveguide band of the waveguide.

8. The photonic crystal element according to claim 7, wherein
the photonic crystal element is provided with a second waveguide in a vicinity of the resonator, said second waveguide being able to guide a light whose frequency is outside of the waveguide band of the first waveguide and with which said part or all of the waveguide stub operates as the resonator, and
the resonator and the second waveguide are optically coupled.

9. The configuration of two or more photonic crystal elements according to claim 8, wherein
the respective second waveguides included in the individual photonic crystal elements are connected with each other.

* * * * *